(12) United States Patent
Tamaoki et al.

(10) Patent No.: US 10,598,236 B2
(45) Date of Patent: Mar. 24, 2020

(54) LAMINATED SHIM FOR DISC BRAKE

(71) Applicant: AKEBONO BRAKE INDUSTRY CO., LTD., Chuo-ku, Tokyo (JP)

(72) Inventors: Isao Tamaoki, Tokyo (JP); Yuta Yamaguchi, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/936,739

(22) Filed: Mar. 27, 2018

(65) Prior Publication Data

US 2018/0283479 A1 Oct. 4, 2018

(30) Foreign Application Priority Data

Mar. 28, 2017 (JP) ................................. 2017-063535

(51) Int. Cl.
*F16D 65/097* (2006.01)
*F16D 65/00* (2006.01)
*B32B 7/12* (2006.01)

(52) U.S. Cl.
CPC ............ *F16D 65/0971* (2013.01); *B32B 7/12* (2013.01); *F16D 65/0006* (2013.01); *B32B 2475/00* (2013.01); *F16D 2200/0004* (2013.01); *F16D 2250/0023* (2013.01); *F16D 2250/0069* (2013.01)

(58) Field of Classification Search
CPC .. F16D 65/0006; F16D 65/092; F16D 65/095; F16D 65/0971; F16D 65/0979; F16D 55/225; F16D 2200/0078; F16D 2250/0023; F16D 2250/0038; F16D 2250/0069; F16D 2055/007

USPC .......... 188/73.43, 71.1, 73.31–73.39, 250 E, 188/250 F
See application file for complete search history.

(56) References Cited

U.S. PATENT DOCUMENTS

2004/0163903 A1* 8/2004 Saka ................... F16D 65/0006
188/250 G
2006/0027427 A1* 2/2006 Anda .................. F16D 65/0006
188/73.1

(Continued)

FOREIGN PATENT DOCUMENTS

DE          3402866 A1 *  9/1984    ......... F16D 65/0006
JP       2010-31960 A        2/2010

*Primary Examiner* — Robert A. Siconolfi
*Assistant Examiner* — San M Aung
(74) *Attorney, Agent, or Firm* — Faegre Drinker Biddle & Reath LLP

(57) ABSTRACT

A laminated shim for a disc brake includes base and cover shim plates. The base shim plate includes a base side substrate portion, and a base side locking piece extending in a lamination direction of the base shim plate and the cover shim plate. The cover shim plate includes a cover side substrate portion which is laminated on the base side substrate portion, and a cover side locking piece which extends from the cover side substrate portion in an extension direction of the base side locking piece and is radially overlapped with the base side locking piece. A circumferential end portion of one of the base side locking piece and the cover side locking piece abuts against a movement restricting surface facing a circumferential direction and provided at one of the base side substrate portion and the cover side substrate portion.

4 Claims, 24 Drawing Sheets

(56) References Cited

U.S. PATENT DOCUMENTS

| | | | |
|---|---|---|---|
| 2006/0157307 A1* | 7/2006 | Tsurumi | F16D 65/0979 188/250 G |
| 2014/0339028 A1* | 11/2014 | Kobayashi | F16D 65/092 188/250 B |
| 2014/0360822 A1* | 12/2014 | Kobayashi | F16D 65/095 188/250 E |
| 2016/0146276 A1* | 5/2016 | Kobayashi | F16D 65/0971 188/250 F |

* cited by examiner

LAMINATED SHIM FOR DISC BRAKE

CROSS REFERENCE TO RELATED APPLICATIONS

This application is based on Japanese Patent Application (No. 2017-063535) filed on Mar. 28, 2017, the contents of which are incorporated herein by way of reference.

BACKGROUND

The present invention relates to a laminated shim for a disc brake arranged between a pad for a disc brake and a pressing member for pressing the pad against a rotor.

A disc brake device strongly clamps a rotor from both sides in an axial direction by a pair of pads and performs braking by friction force acting on abutting portions between linings configuring the pads and both axial side surfaces of the rotor. At the time of such braking, an attitude of the pad tends to become unstable since a portion of the pad where the friction force acts on and a portion where the pressing member such as a piston or a caliper claw part presses the pad are displaced by a thickness of the pad. When the attitude of the pad becomes unstable, the pad vibrates and generates noise called squeal, and uneven wear tends to occur on the lining. In the present description, the axial direction, a circumferential direction and a radial direction refer to an axial direction, a circumferential direction and a radial direction with respect to the rotor unless otherwise specified.

In order to suppress the squeal and uneven wear, a shim is usually clamped between a back surface of a pressure plate and a pressing member that presses the back surface. The shim may be a single plate shim formed by one shim plate, or a laminated shim formed by laminating a plurality of shim plates so that an effect of suppressing the squeal and uneven wear is improved. A plurality of structures are known for the laminated shim, for example, JP 2010-031960 A discloses a structure in which a pair of laminated shim plates is bonded by an adhesive.

SUMMARY

It is one advantageous aspect of the present invention to provide a laminated shim for a disc brake including:
a base shim plate configured to be attached to a back surface of a pressure plate of a pad for the disc brake; and
a cover shim plate laminated at a back surface side of the base shim plate,
wherein the base shim plate includes:
a base side substrate portion having a flat shape, and
a base side locking piece extending from the base side substrate portion in a lamination direction of the base shim plate and the cover shim plate,
wherein the cover shim plate includes:
a cover side substrate portion which has a flat plate shape and is laminated on the base side substrate portion, and
a cover side locking piece which extends from the cover side substrate portion in an extension direction of the base side locking piece and is overlapped with respect to the base side locking piece in a radial direction of a rotor of the disc brake, and
wherein a circumferential end portion of one of the base side locking piece and the cover side locking piece of corresponding one of the base shim plate and the cover shim plate that is arranged at a rear side in the extension direction abuts against a movement restricting surface facing a circumferential direction and provided at one of the base side substrate portion and the cover side substrate portion of the other one of the base shim plate and the cover shim plate, so that movement of the one of the base shim plate and the cover shim plate in the circumferential direction with respect to the other one is restricted.

A circumferential dimension of the base side locking piece and a circumferential dimension of the cover side locking piece may be different from each other.

A tip end portion of the base side locking piece and a tip end portion of the cover side locking piece may be inserted into a recess provided on the back surface of the pressure plate.

The base shim plate and the cover shim plate may be bonded to each other by an adhesive.

DETAILED DESCRIPTION OF EXEMPLIFIED EMBODIMENTS

Figure 1:
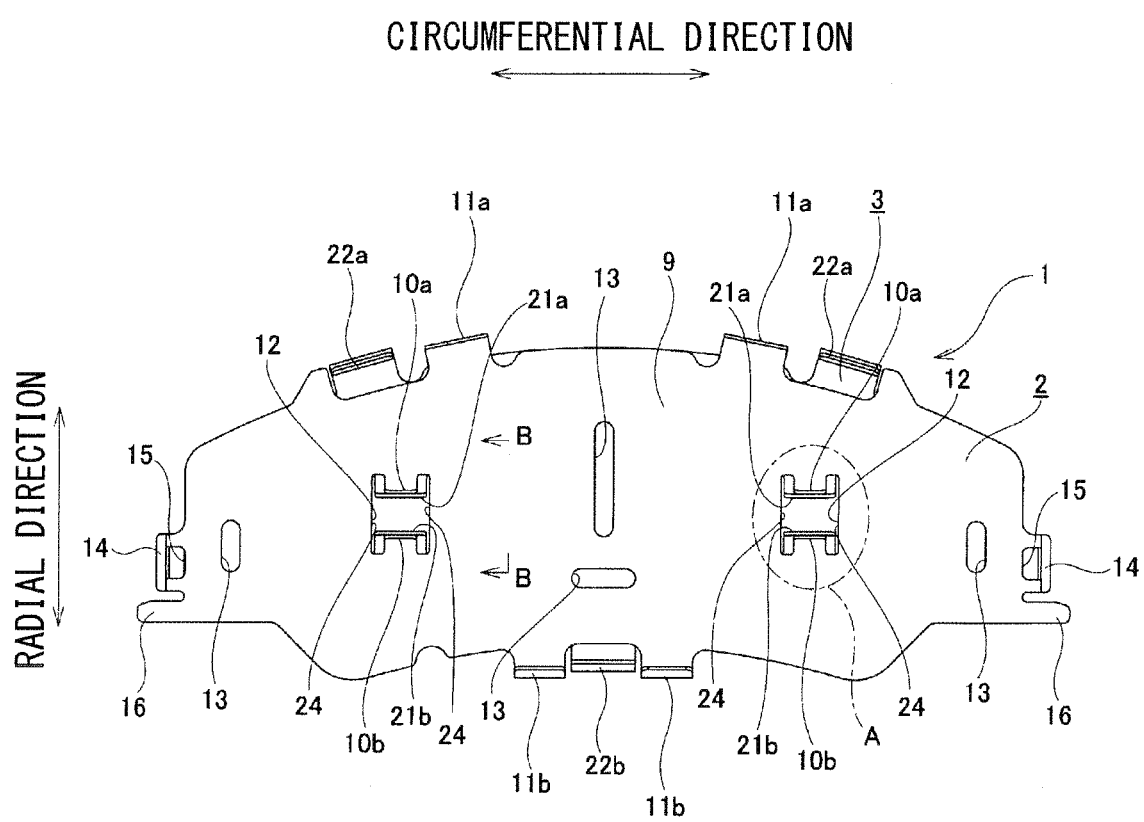
FIG. 1 is an orthographic projection view of a laminated shim according to a first embodiment as seen from a front surface side.
Figure 2:
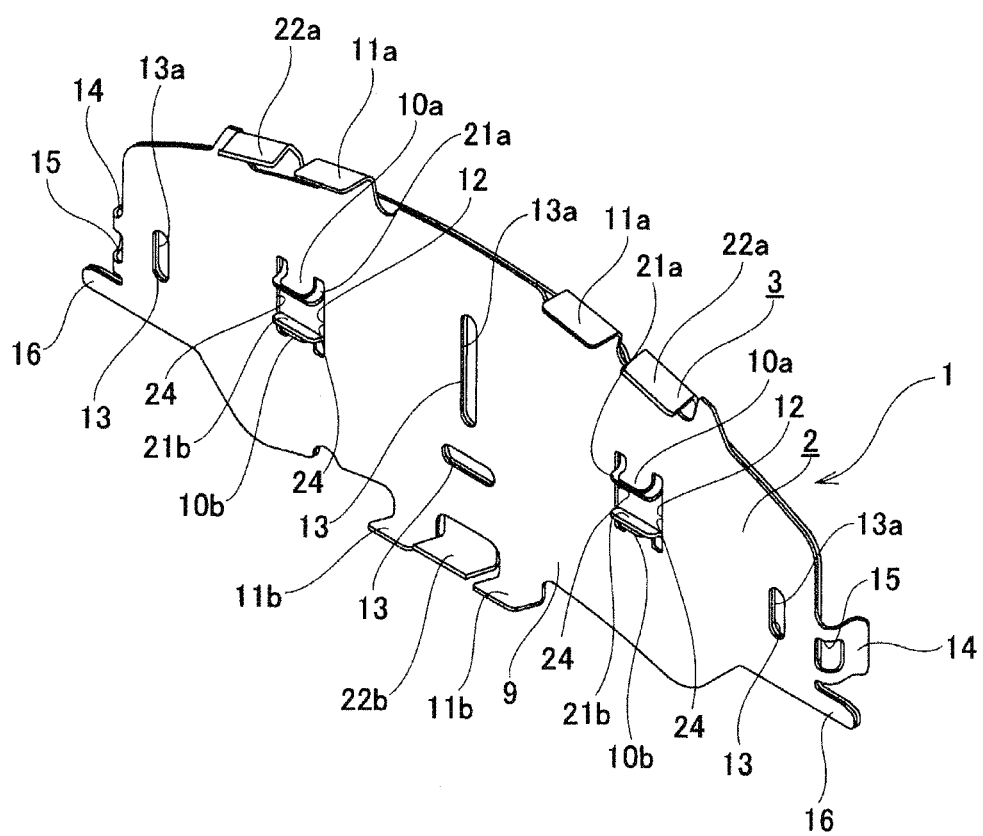
FIG. 2 is a perspective view of the laminated shim according to the first embodiment.

Among the plurality of shim plates configuring the laminated shim, a base shim plate attached to the back surface of the pressure plate moves in the circumferential direction together with the pad during braking, while a cover shim plate pressed by the pressing member does not move in the circumferential direction but stay at an original position thereof. Therefore, there is a possibility that the base shim plate and the cover shim plate are displaced in the circumferential direction as the disc brake device is used. Further, in the case of a laminated shim in which a base shim plate and a cover shim plate are bonded to each other, when displacement in the circumferential direction occurs between the base shim plate and the cover shim plate, an displacement amount does not decrease and becomes larger each time when braking is repeated. In a laminated shim of a conventional structure, since there is no means for restricting the movement in the circumferential direction provided between the pair of shim plates, the displacement amount in the circumferential direction may become excessive.

The present invention has been made in view of the above circumstances, and an object thereof is to realize a structure capable of preventing the displacement amount in the circumferential direction between the shim plates configuring the laminated shim from becoming excessive.

First Embodiment

A first embodiment will be described with reference to FIGS. 1 to 12. A laminated shim 1 of the first embodiment includes a base shim plate 2 and a cover shim plate 3, and is mounted on a pad 4 as shown in FIGS. 9 to 12. The pad 4 is configured by attaching and fixing a lining 6 to a front surface of a pressure plate 5. In a state where such a pad 4 is assembled to a disc brake device, the laminated shim 1 is arranged between a back surface of the pressure plate 5 configuring the pad 4 and a pressing member 7 for pressing the back surface of the pressure plate 5. In addition, a front surface of the lining 6 configuring the pad 4 is opposed to an axial side surface of a rotor 31.

Figure 5:
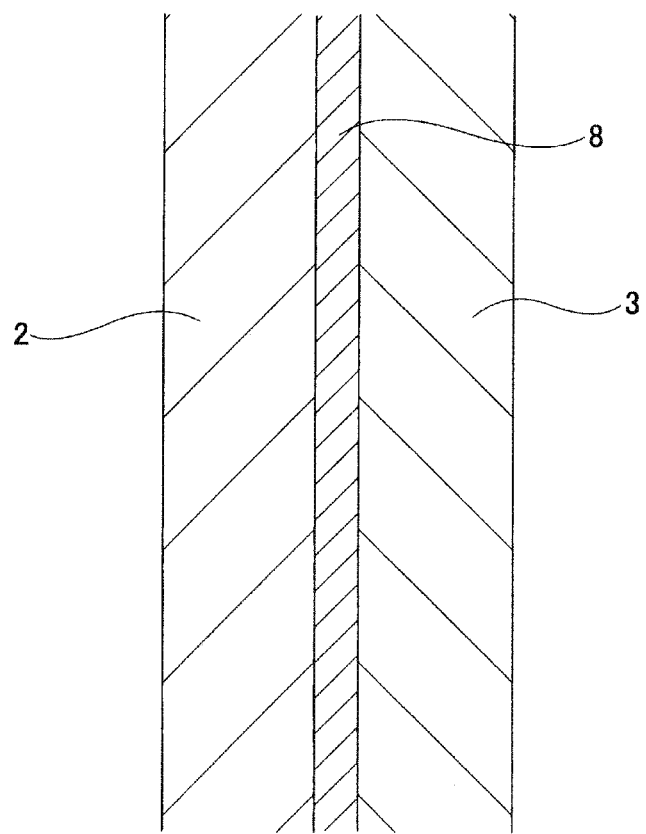
FIG. 5 is an enlarged sectional view taken along a line B-B of FIG. 1.
Figure 6:
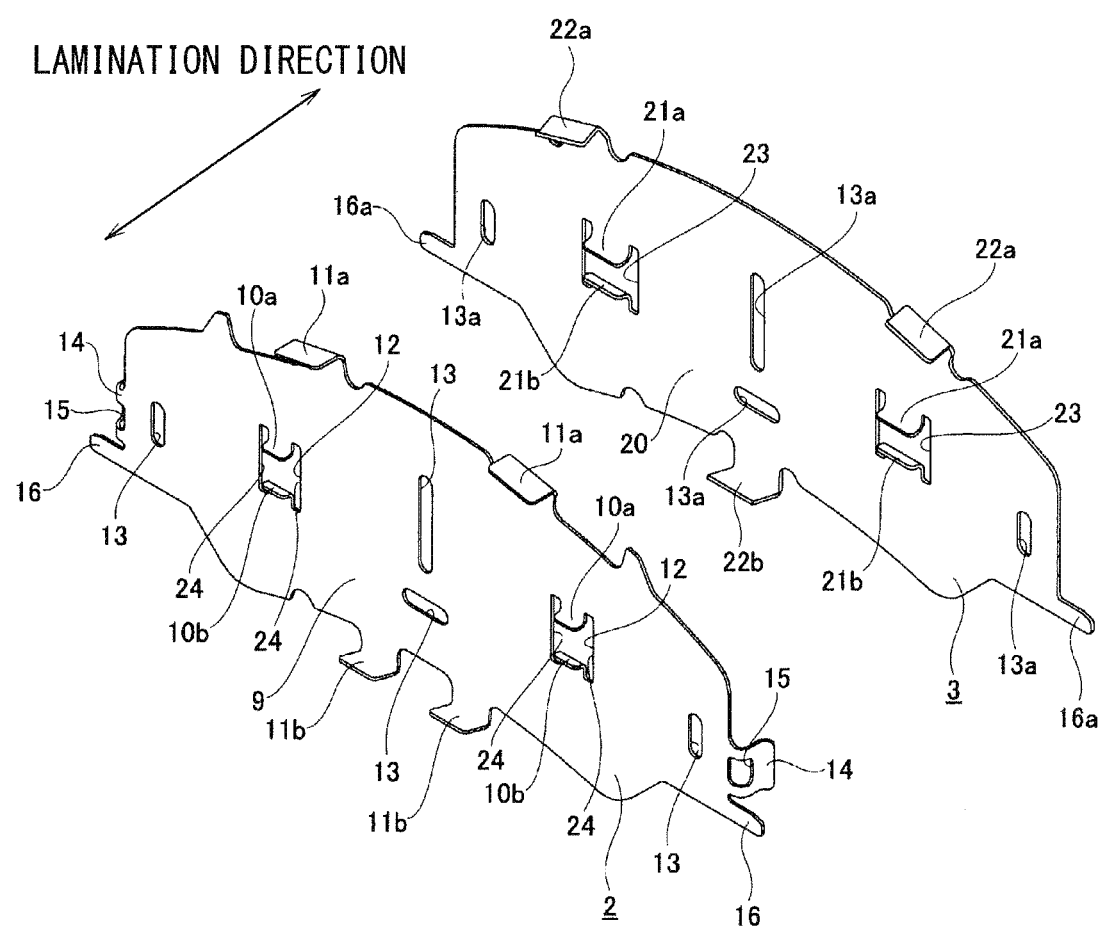
FIG. 6 is an exploded perspective view of the laminated shim according to the first embodiment.
Figure 7A:
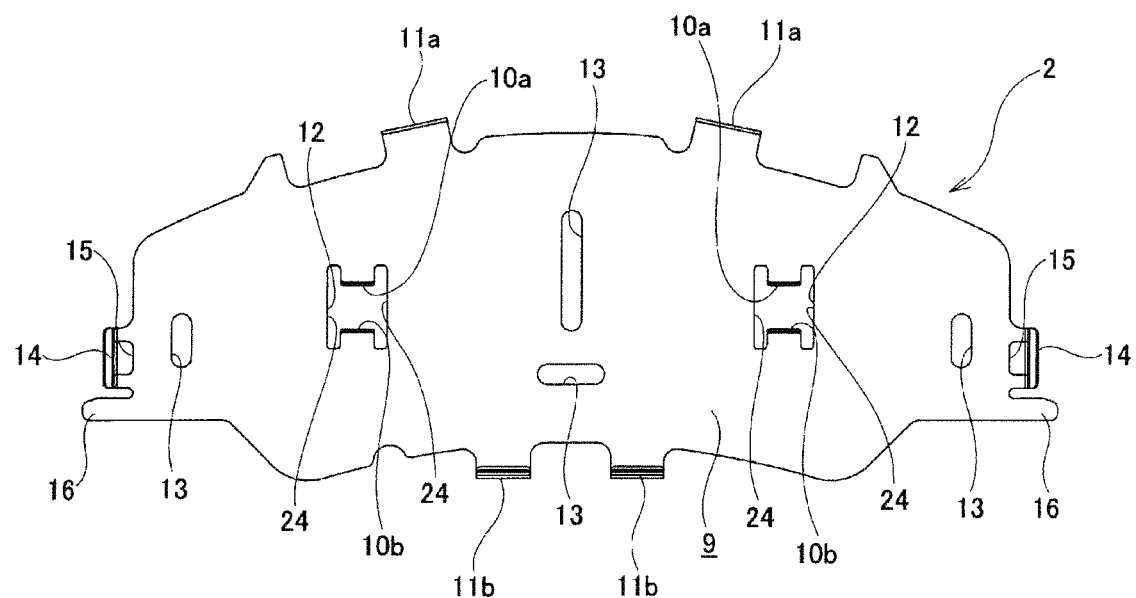
FIG. 7A is an orthographic projection view of a base shim plate taken from the laminated shim according to the first embodiment as seen from the front surface side.
Figure 7B:
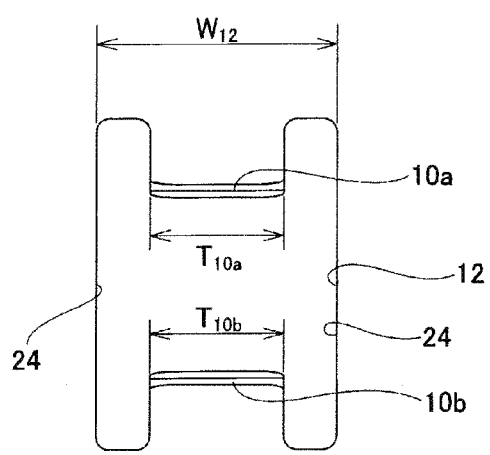
FIG. 7B is an enlarged view of a part of FIG. 7A.
Figure 8A:
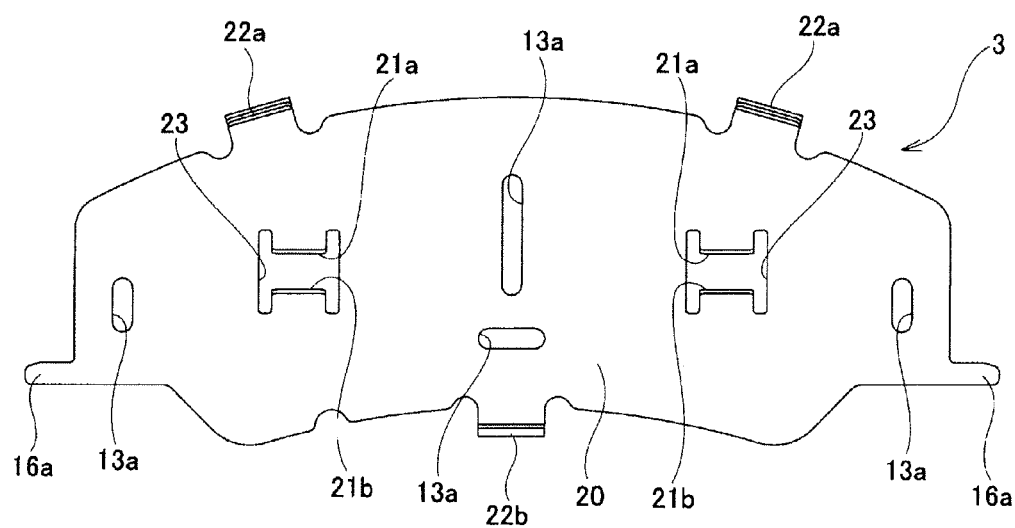
FIG. 8A is an orthographic projection view of a cover shim plate taken from the laminated shim according to the first embodiment as seen from the front surface side.
Figure 8B:
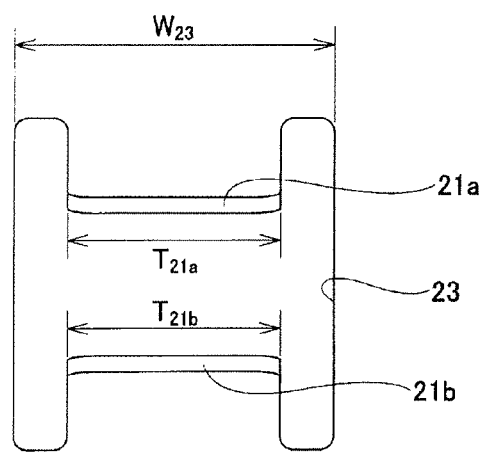
FIG. 8B is an enlarged view of a part of FIG. 8A.

In the first embodiment, before the laminated shim 1 is mounted to the pad 4, the base shim plate 2 and the cover shim plate 3 are bonded to each other as a whole by an adhesive made of a synthetic resin such as an elastomer. Therefore, there is an adhesive layer 8 between the base shim plate 2 and the cover shim plate 3 as shown in FIG. 5.

The base shim plate 2 is formed by punching and bending a metal plate with a press, and is attached to the back surface of the pressure plate 5. The base shim plate 2 has a flat-plate-shaped base side substrate portion 9, a plurality of (four in the illustrated example) base side locking pieces 10a, 10b, and a plurality of (four in the illustrated example) base side attachment pieces 11a, 11b.

The base side substrate portion 9 is substantially rectangular and has a pair of base side through holes 12 in a substantially H-shape at both circumferential side portions thereof. The base side locking pieces 10a, 10b extend from a radial outer edge and a radial inner edge of a circumferential intermediate portion of the base side through holes 12 toward a base shim plate 2 side in a lamination direction of the base shim plate 2 and the cover shim plate 3. In other words, the base side locking pieces 10a, 10b are bent upward at right angles so as to protrude from the radial outer edge and the radial inner edge of the circumferential intermediate portion of the base side through holes 12 toward a pressure plate 5 side. In the first embodiment, H-shaped cuts are formed on the base side substrate portion 9 so as to form the base side locking pieces 10a, 10b and the base-side through holes 12, and tip half parts of a pair of plate-shaped portions at an inner side of the cut are bent upward to form the base side locking pieces 10a, 10b. Further, the cuts whose opening width at the circumferential intermediate portion is expanded by bending the tip half parts of the pair of plate-shaped portions upward form the base side through holes 12. Incidentally, in the first embodiment, the shim plate positioned at a front side in an extension direction of the base side locking pieces 10a, 10b is the base shim plate 2, and the shim plate positioned at a rear side in the extension direction of the base side locking pieces 10a, 10b is the cover shim plate 3.

In the base side substrate portion 9, grease retaining holes 13, which are long in a radial direction or a circumferential direction, for retaining grease for lubrication therein are provided at both circumferential sides of the base side through holes 12.

The base side attachment pieces 11a, 11b are parts for attaching the base shim plate 2 to the pressure plate 5, and extend from a radially outer circumferential edge and a radially inner circumferential edge of the base side substrate portion 9 in the same direction as the extension direction of the base side locking pieces 10a, 10b. In the base side attachment pieces 11a, 11b, the pair of base side attachment pieces 11a arranged radially outward is provided at both circumferential side portions of the radially outer circumferential edge of the base side substrate portion 9 in a state of being separated from each other in the circumferential direction. On the other hand, the pair of base side attachment pieces 11b arranged radially inward is provided at a circumferential central side portion of the radially inner circumferential edge of the base side substrate portion 9 in a state of being separated from each other in the circumferential direction.

A pair of shim plate holding parts 14 extending toward a cover shim plate 3 side in the lamination direction of the base shim plate 2 and the cover shim plate 3 is provided at both circumferential side edges of the base side substrate portion 9. The shim plate holding part 14 holds another cover shim plate (not shown) overlapped on a back surface side of the cover shim plate 3. Tip end portions of the pair of shim plate holding parts 14 are inclined in directions away from each other in the circumferential direction toward tip end sides. A rectangular holding hole 15 is provided at a base end portion or an intermediate portion of the shim plate holding part 14.

A pair of fall-off preventing pieces 16 extending in the circumferential direction separately is provided at both circumferential side edges of the base side substrate portion 9 radially inward than the shim plate holding parts 14. When the laminated shim 1 is mounted on the pad 4, the fall-off preventing pieces 16 are positioned on a back surface side of a pair of ear portions 17 configuring the pressure plate 5. Then, when the pad 4 is assembled to the pad supporting member 18 such as a caliper or a support configuring a disc brake device, the fall-off preventing pieces 16 are positioned at an inner side of concave torque receiving parts 19 provided on a pad supporting member 18 together with the ear portions 17 of the pressure plate 5. Thereby, the laminated shim 1 is prevented from falling off from the pad supporting member 18 in the radial direction.

The cover shim plate 3 is formed by punching and bending a metal plate with a press, and is laminated in a state of being bonded to a back surface of the base shim plate 2. The cover shim plate 3 has a flat-plate-shaped cover side substrate portion 20 laminated on the base side substrate portion 9, a plurality of (four in the illustrated example) cover side locking piece 21*a*, 21*b*, and a plurality of (three in the illustrated example) cover side attachment pieces 22*a*, 22*b*.

The cover side substrate portion 20 has substantially the same shape as the base side substrate portion 9, and has a pair of cover side through holes 23 in a substantially H-shape at portions matching with the base side through holes 12 on both circumferential side portions thereof. The cover side locking pieces 21*a*, 21*b* extend from a radial outer edge and a radial inner edge of a circumferential intermediate portion of the cover side through holes 23 toward the base shim plate 2 side in the lamination direction, which is the same direction as the extension direction of base side locking pieces 10*a*, 10*b*. In other words, the cover side locking pieces 21*a*, 21*b* are bent upward at right angles so as to protrude from the radial outer edge and the radial inner edge of the circumferential intermediate portion of the cover side through holes 23 toward the pressure plate 5 side. In the first embodiment, H-shaped cuts are formed on the cover side substrate portion 20 so as to form the cover side locking pieces 21*a*, 21*b* and the cover side through holes 23, and tip half parts of a pair of plate-shaped portions at an inner side of the cut are bent upward to form the cover side locking pieces 21*a*, 21*b*. Further, the cuts whose opening width at the circumferential intermediate portion is expanded by bending the tip half parts of the pair of plate-shaped portions upward form the cover side through holes 23.

Figure 4:
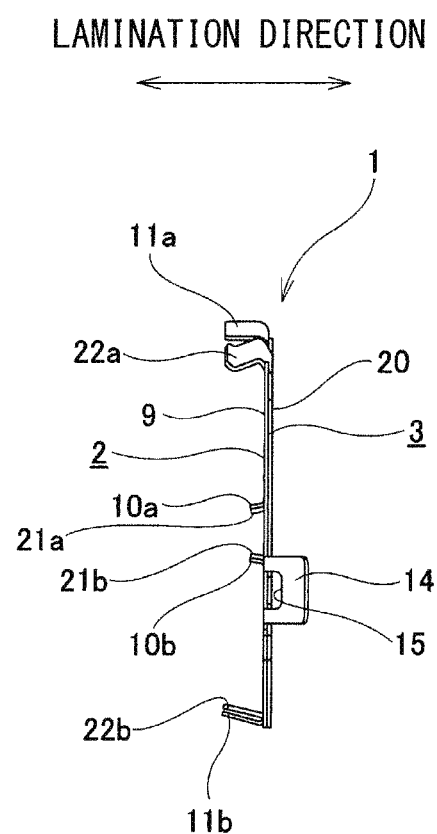
FIG. 4 is a side view of the laminated shim according to the first embodiment.
Figure 11:
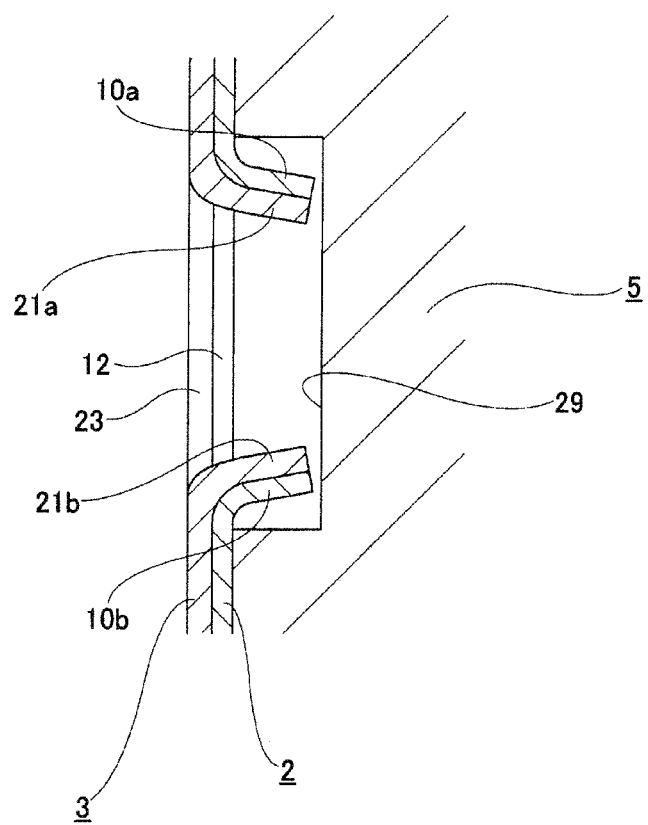
FIG. 11 is an enlarged sectional view taken along a line C-C of FIG. 9.
Figure 12:
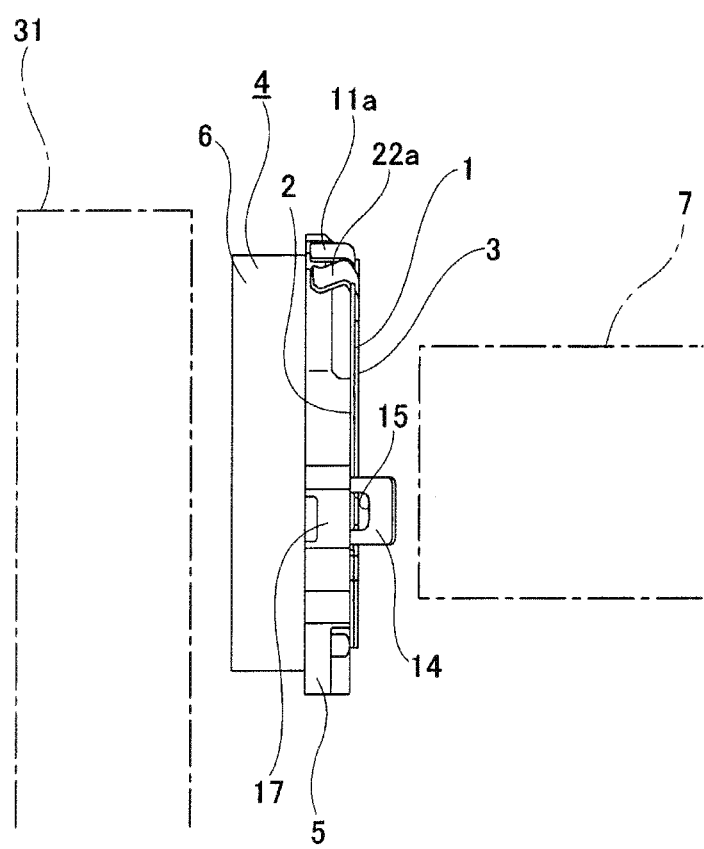
FIG. 12 is a side view of the pad mounted with the laminated shim according to the first embodiment.

In the first embodiment, an operation of forming the base side locking pieces 10*a*, 10*b* and the cover side locking pieces 21*a*, 21*b* is performed in a state where the base shim plate 2 and the cover shim plate 3 are bonded. That is, in a state where the back surface of the base side substrate portion 9 and a front surface of the cover side substrate portion 20 are bonded, the pair of plate-shaped portions at the inner side of the cuts formed on the base side substrate portion 9 and the pair of plate-shaped portions at the inner side of the cuts formed on the cover side substrate portion 20 are bend toward the base shim plate 2 side with respect to the lamination direction, so as to form the base side locking pieces 10*a*, 10*b* and the cover side locking pieces 21*a*, 21*b* simultaneously. Therefore, the base side locking pieces 10*a*, 10*b* and the cover side locking pieces 21*a*, 21*b* are overlapped in the radial direction as shown in FIGS. 4 and 11. In addition, the cover side locking pieces 21*a*, 21*b* are inserted into the base side through holes 12, the radially outer cover side locking piece 21*a* is positioned radially inward of the radially outer base side locking piece 10*a*, and the radially inner cover side locking piece 21*b* is positioned radially outward of the radially inner base side locking piece 10*b*.

Figure 3:
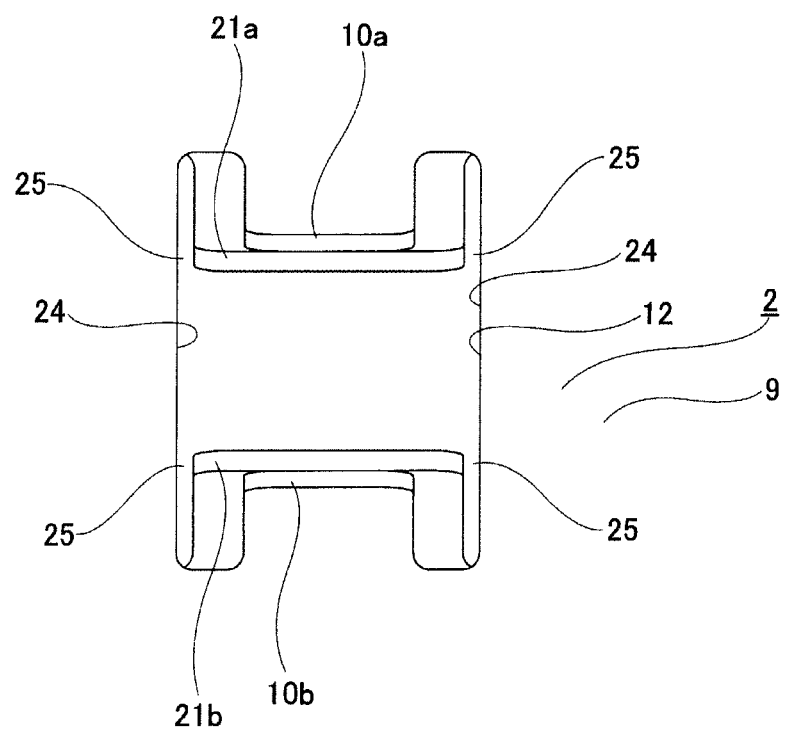
FIG. 3 is an enlarged view of a part A of FIG. 1.

Particularly, in the first embodiment, an opening width W23 of the cover side through hole 23 in the circumferential direction is larger than an opening width W12 of the base side through hole 12 in the circumferential direction (W23>W12). In addition, a width dimension T21*a* (=T21*b*) of the cover side locking pieces 21*a*, 21*b* in the circumferential direction is larger than a width dimension T10*a* (=T10*b*) of the base side locking pieces 10*a*, 10*b* in the circumferential direction, and smaller than the opening width W12 of the base side through hole 12 in the circumferential direction (T10*b*<T21*a*<W12). Therefore, as shown in FIG. 3, when the base shim plate 2 and the cover shim plate 3 are not displaced in the circumferential direction, both circumferential end portions of the cover side locking pieces 21*a*, 21*b* project over both circumferential end portions of the base side locking pieces 10*a*, 10*b* in the circumferential direction separately. Therefore, both circumferential end portions of the cover side locking pieces 21*a*, 21*b* are opposed to movement restricting surfaces 24 facing the circumferential direction, which are circumferential side edges of an inner circumferential edge of the base side through holes 12, with a minute gap 25 interposed therebetween.

Grease retaining holes 13*a* are provided at portions of the cover side substrate portion 20 that match with the grease retaining holes 13 provided on the base side substrate portion 9. In addition, a pair of fall-off preventing pieces 16*a* extending in the circumferential direction is provided on both circumferential side edges of the cover side substrate portion 20 at portions matching with the fall-off preventing pieces 16 of the base shim plate 2.

The cover side attachment pieces 22*a*, 22*b* are parts for attaching the cover shim plate 3 to the pressure plate 5, and extend from a radially outer circumferential edge and a radially inner circumferential edge of the cover side substrate portion 20 in the same direction as the extension direction of the cover side locking pieces 21*a*, 21*b*. In the cover side attachment pieces 22*a*, 22*b*, the pair of cover side attachment pieces 22*a* arranged radially outward are provided at both circumferential side portions of the radially outer circumferential edge of the cover side substrate portion 20 in a state of being separated from each other wider than the pair of base side attachment pieces 11*a* in the circumferential direction. On the other hand, the one cover side attachment piece 22*b* arranged radially inward is provided at a circumferential central portion of the radially inner circumferential edge of the cover side substrate portion 20.

In the first embodiment, when the back surface of the base side substrate portion 9 and the front surface of the cover side substrate portion 20 are bonded by an adhesive, and the cover shim plate 3 is laminated on a back surface side of the base shim plate 2, the pair of radially outer cover side attachment pieces 22*a* are positioned at both circumferential sides of the pair of radially outer base side attachment pieces 11*a*, and the radially inner cover side attachment piece 22*b* is positioned between the pair of radially inner base side attachment pieces 11*b*.

Figure 9:
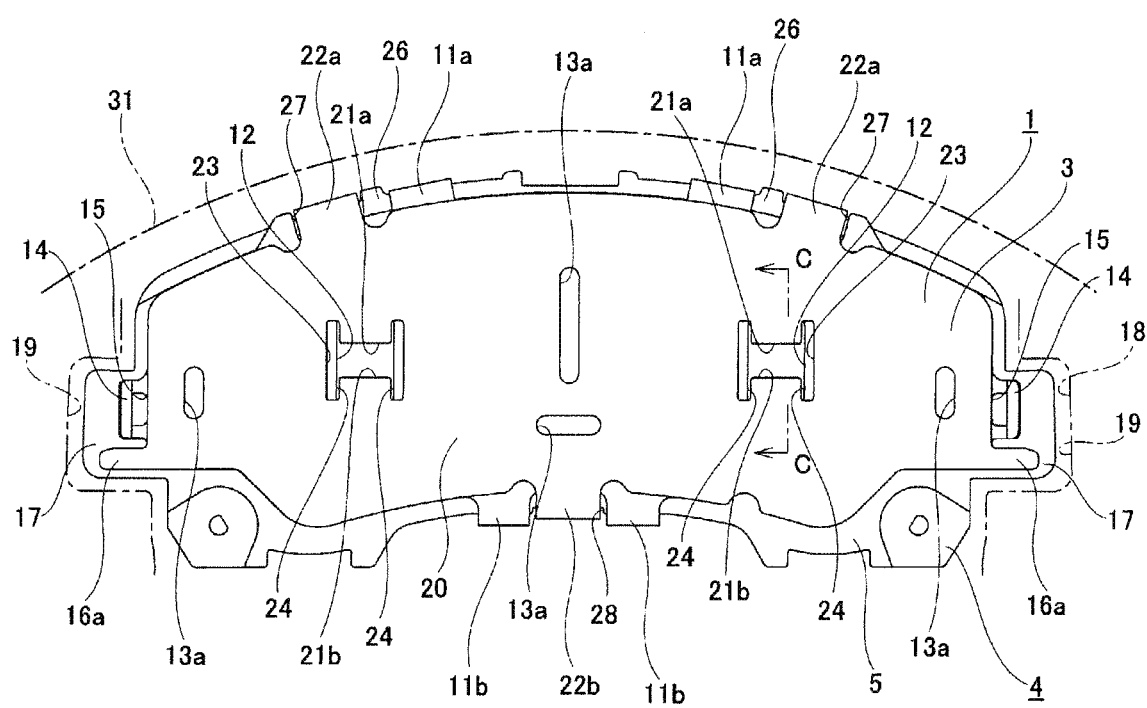
FIG. 9 is an orthographic projection view of a pad mounted with the laminated shim according to the first embodiment as seen from a back surface side.
Figure 10:
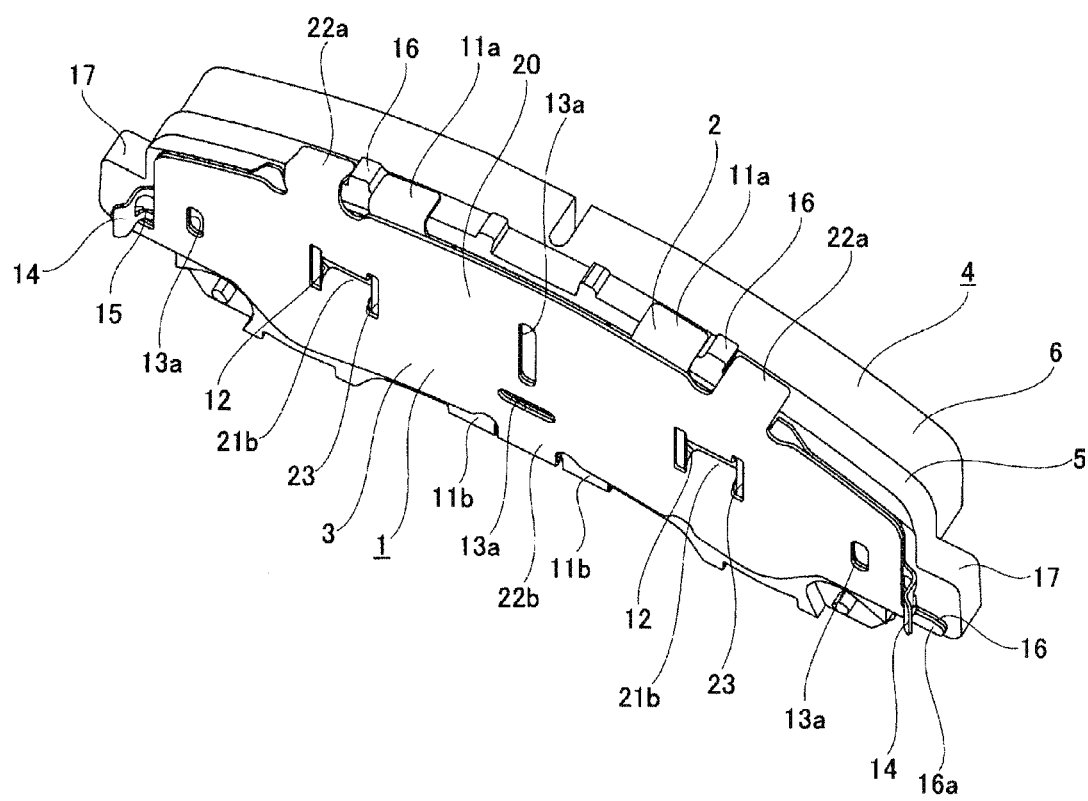
FIG. 10 is a perspective view of the pad mounted with the laminated shim according to the first embodiment.

In order to mount the above described laminated shim 1 on the pad 4, the pressure plate 5 is elastically clamped from both sides in the radial direction by the base side attachment pieces 11*a*, 11*b* and the cover side attachment pieces 22*a*, 22*b*. Specifically, as shown in FIGS. 9 and 10, circumferential outer side edges of the radially outer base side attachment pieces 11*a* are engaged with circumferential inner side surfaces of a pair of projection portions 26 formed on a radially outer circumferential edge of the pressure plate 5, and the radially outer cover side attachment pieces 22*a* are engaged with outer side engaging recesses 27 formed on a radially outer circumferential edge of the pressure plate 5. Further, the radially outer base side attachment pieces 11*b* are arranged at both circumferential sides of an inner side engaging recess 28 formed on a radially inner circumferential edge of the pressure plate 5, and the radially inner cover side attachment piece 22b is engaged with the inner side engaging recess 28. In such a mounting state, the displacement of the laminated shim 1 with respect to the pressure plate 5 in the radial and circumferential direction is restricted to some extent.

In addition, when the laminated shim 1 is mounted on the pad 4, as shown in FIG. 11, tip half parts of the base side locking pieces 10a, 10b and cover side locking pieces 21a, 21b are inserted into a pair of circular recesses 29 formed at both circumferential sides of the back surface of the pressure plate 5.

According to the laminated shim 1 of the first embodiment having such a configuration, a displacement amount in the circumferential direction between a base shim plate 2 and a cover shim plate 3 can be prevented from becoming excessive.

That is, in the first embodiment, the cover side locking pieces 21a, 21b provided on the cover shim plate 3 are inserted into the base side through holes 12 provided on the base shim plate 2, and both circumferential end portions of the cover side locking pieces 21a, 21b are opposed to the movement restricting surfaces 24, which are circumferential side edges of the base side through holes 12, with the minute gap 25 interposed therebetween. For this reason, when the base shim plate 2 moves in the circumferential direction together with the pad 4 during braking by a disc brake device, circumferential end portions of the cover side locking pieces 21a, 21b abut against the movement restricting surfaces 24 in the circumferential direction. Therefore, the movement of the base shim plate 2 with respect to the cover shim plate 3 in the circumferential direction is prevented from becoming equal to or larger than the gap 25.

Further, in the first embodiment, the width dimension T21a (=T21b) of the cover side locking pieces 21a, 21b in the circumferential direction is larger than the width dimension T10a (=T10b) of the base side locking pieces 10a, 10b in the circumferential direction, and both circumferential end portions of the cover side locking pieces 21a, 21b project over both circumferential end portions of the base side locking pieces 10a, 10b in the circumferential direction separately. For this reason, the gap 25 between both circumferential end portions of the cover side locking pieces 21a, 21b and the movement restricting surfaces 24 can be reduced as compared with a case where the opening width of the cover side through hole in the circumferential direction is the same as the opening width of the base side through hole in the circumferential direction, and the width dimension of the cover side locking piece in the circumferential direction is the same as the width dimension of the base side locking piece in the circumferential direction. Therefore, a displacement amount of the base shim plate 2 with respect to the cover shim plate 3 in the circumferential direction can be reduced.

In addition, not only is the width dimension T21a (=T21b) of the cover side locking pieces 21a, 21b in the circumferential direction larger than the width dimension T10a (=T10b) of the base side locking pieces 10a, 10b in the circumferential direction, the opening width W23 of the cover side through hole 23 in the circumferential direction is also larger than the opening width W12 of the base side through hole 12 in the circumferential direction. Therefore, it is also possible to secure a clearance when punching the H-shaped cut on the cover side substrate portion 20.

Further, since the base side locking pieces 10a, 10b and the cover side locking pieces 21a, 21b are overlapped in the radial direction, the displacement between the base shim plate 2 and the cover shim plate 3 in the radial direction can also be prevented.

Second Embodiment

Figure 13:
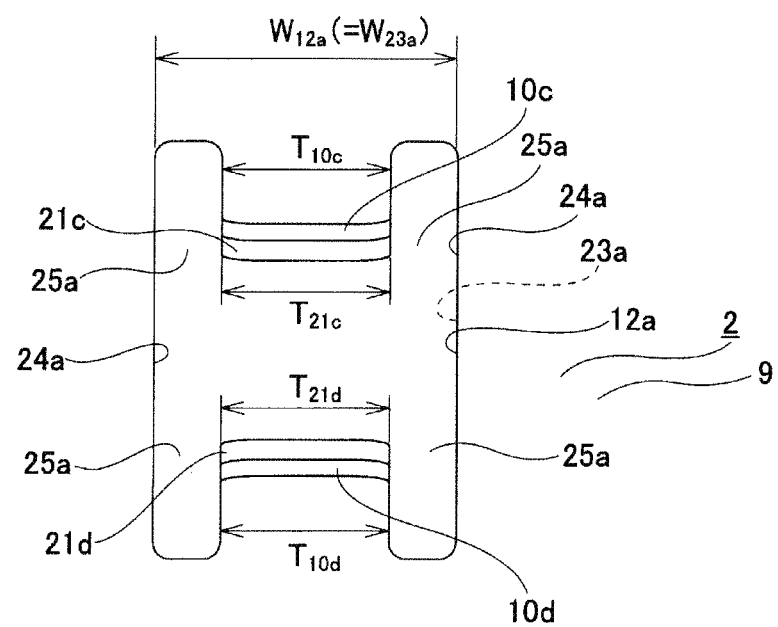
FIG. 13 is a view equivalent to FIG. 3 relating to a laminated shim according to a second embodiment.
Figure 14:
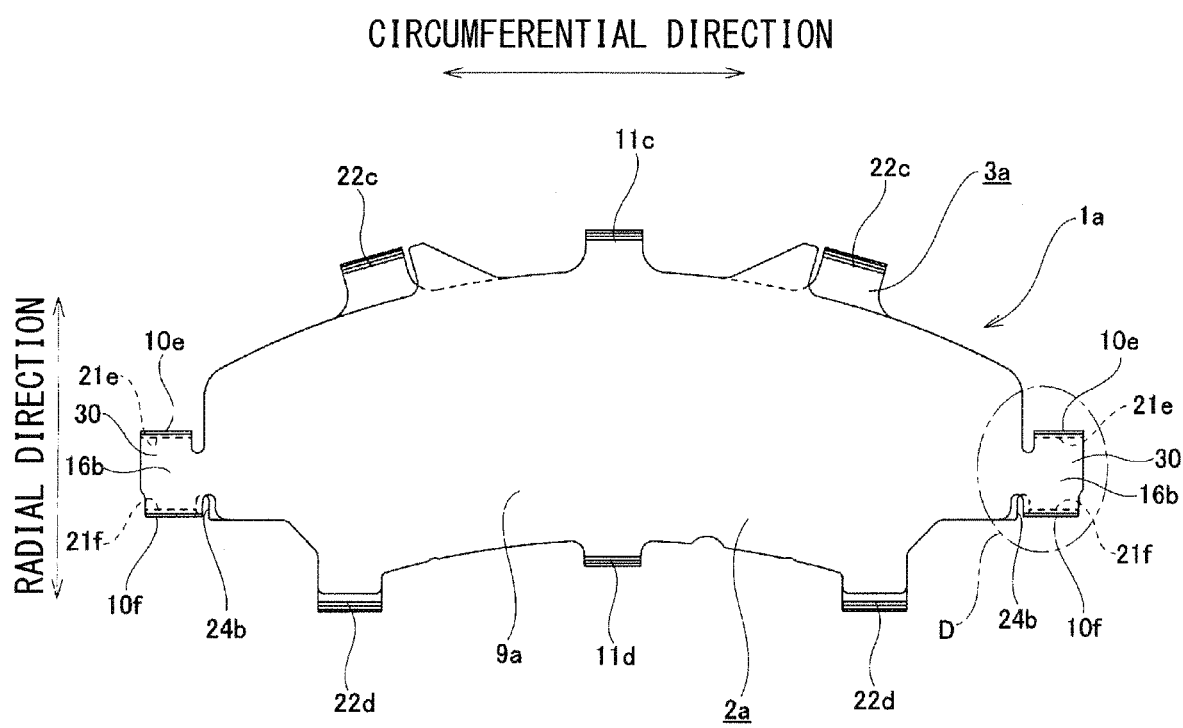
FIG. 14 is an orthographic projection view of a laminated shim according to a third embodiment as seen from the front surface side.
Figure 15:
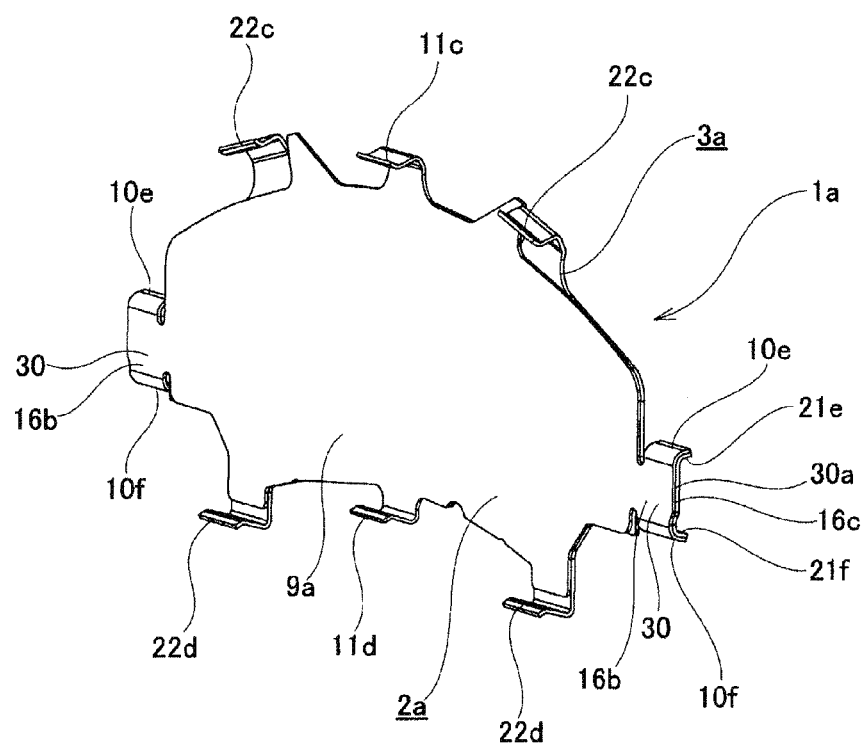
FIG. 15 is a perspective view of the laminated shim according to the third embodiment.

A second embodiment will be described with reference to FIG. 13. The second embodiment is a modification of the first embodiment. In the second embodiment, a width dimension T10c (=T10d) of base side locking pieces 10c, 10d in the circumferential direction is the same as a width dimension T21c (=T21d) of cover side locking pieces 21c, 21d in the circumferential direction (T10c=T21c). In addition, an opening width W12a of a base side through hole 12a in the circumferential direction is the same as an opening width W23a of a cover side through hole 23a in the circumferential direction (W12a=W23a). Therefore, compared to the structure of the first embodiment, a circumferential dimension of a gap 25a between circumferential end portions of the cover side locking pieces 21c, 21d and movement restricting surfaces 24a of the base side through holes 12a is larger.

In the second embodiment having such a configuration, when the base shim plate 2 moves in the circumferential direction with respect to the cover shim plate 3, a displacement amount of the base shim plate 2 with respect to the cover shim plate 3 in the circumferential direction is larger than in the first embodiment. However, in the second embodiment, the movement of the base shim plate 2 in the circumferential direction with respect to the cover shim plate 3 can also be restricted by circumferential end portions of the cover side locking pieces 21c, 21d and the movement restricting surfaces 24a abutting against each other. In addition, it is also possible to simultaneously punch the base side substrate portion 9 and the cover side substrate portion 20 to form H-shaped cuts in the second embodiment. Other configurations and operational effects of the second embodiment are the same as those in the first embodiment.

Third Embodiment

A third embodiment will be described with reference to FIGS. 14 to 23. The feature of a laminated shim 1a according to the third embodiment is that forming positions of base side locking pieces 10e, 10f and cover side locking pieces 21e, 21f are changed. That is, in the third embodiment, the base side locking pieces 10e, 10f are respectively provided on a pair of fall-off preventing pieces 16b at both circumferential sides of a base side substrate portion 9a configuring a base shim plate 2a. For this reason, a circumferential outer end portion or intermediate portion of the fall-off preventing piece 16b is formed as a substantially rectangular wide portion 30 whose radial width dimension is larger than that of a circumferential inner end portion of the fall-off preventing piece 16b. The base side locking pieces 10e, 10f extend from a radial outer edge and a radial inner edge of such a wide portion 30 to a cover shim plate 3a side in a lamination direction of the base shim plate 2a and a cover shim plate 3a. Incidentally, a radial width dimension of the wide portion 30 is slightly smaller than a radial width dimension of the ear portion 17 of the pressure plate 5. Incidentally, in the third embodiment, the shim plate positioned at a front side in an extension direction of the base side locking pieces 10e, 10f is the cover shim plate 3a, and the shim plate positioned at a rear side in the extension direction of the base side locking pieces 10e, 10f is the base shim plate 2a.

Further, the cover side locking piece 21e, 21f are respectively provided on a pair of fall-off preventing pieces 16c at both circumferential sides of a cover side substrate portion 20a configuring the cover shim plate 3a. For this reason, a circumferential outer end portion or intermediate portion of the fall-off preventing piece 16c is formed as a substantially rectangular wide portion 30a whose radial width dimension is larger than that of a circumferential inner end portion of the fall-off preventing piece 16c. The cover side locking pieces 21e, 21f extend from a radial outer edge and a radial inner edge of such a wide portion 30a toward a cover shim plate 3a side in the lamination direction, which is the same direction as the extension direction of base side locking pieces 10e, 10f. Incidentally, a radial width dimension of the wide portion 30a is the same as a radial width dimension of the wide portion 30 provided on the base shim plate 2a, and is slightly smaller than a radial width dimension of the ear portion 17 of the pressure plate 5.

The base side locking pieces 10e, 10f and the cover side locking pieces 21e, 21f are also overlapped in the radial direction in the third embodiment. Therefore, the displacement between the base shim plate 2a and the cover shim plate 3a in the radial direction can be prevented. In addition, the radially outer base side locking piece 10e is positioned radially outward of the radially outer cover side locking piece 21e, and the radially inner base side locking piece 10f is positioned radially inward of the radially inner cover side locking piece 21f.

Figure 16:
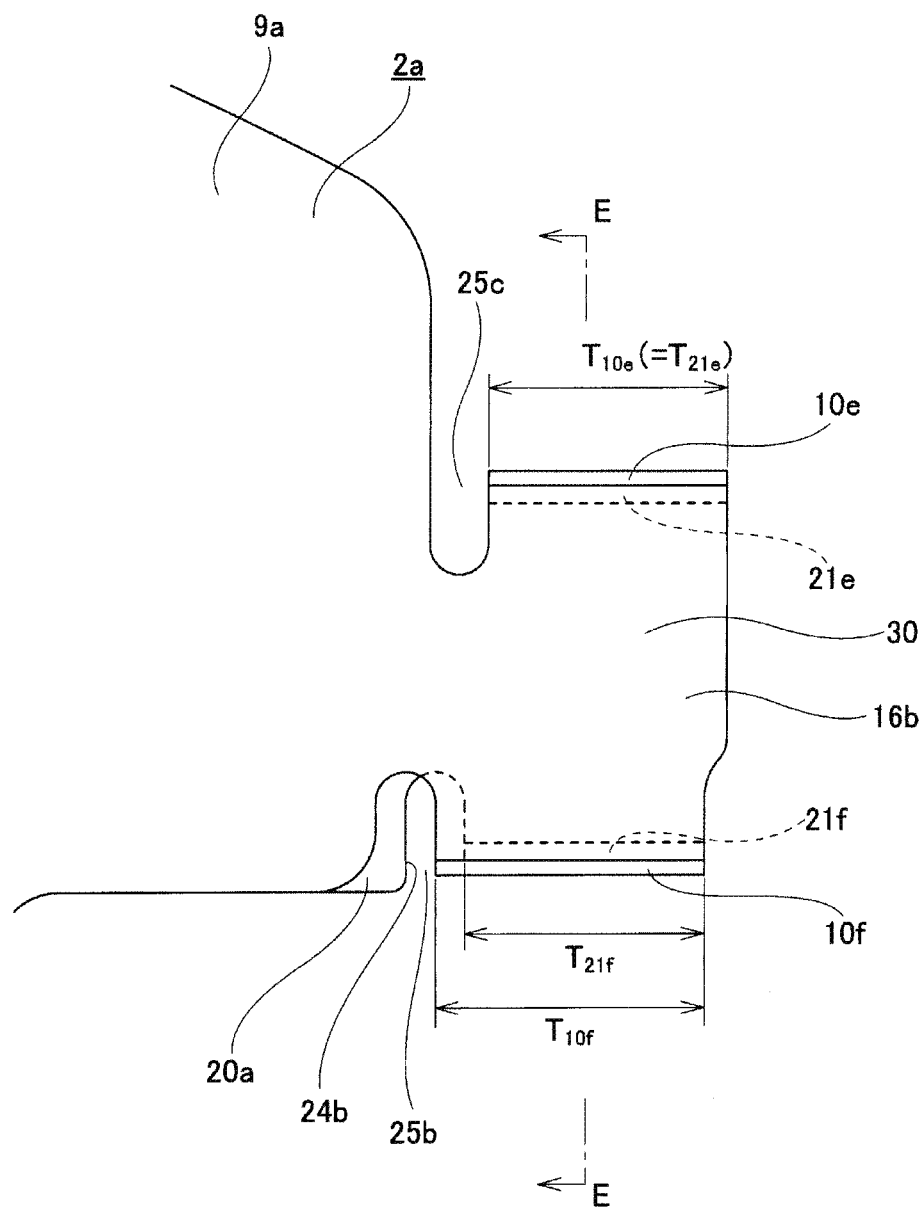
FIG. 16 is an enlarged view of a part D of FIG. 14.
Figure 17:
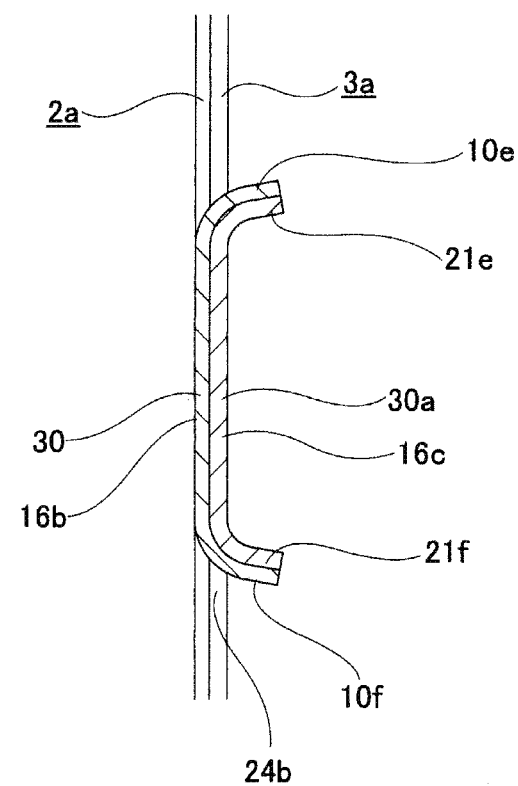
FIG. 17 is a sectional view taken along a line E-E of FIG. 16.
Figure 18:
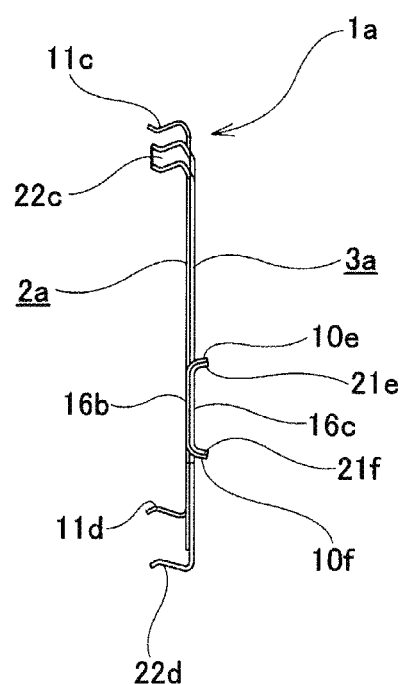
FIG. 18 is a side view of the laminated shim according to the third embodiment.
Figure 19:
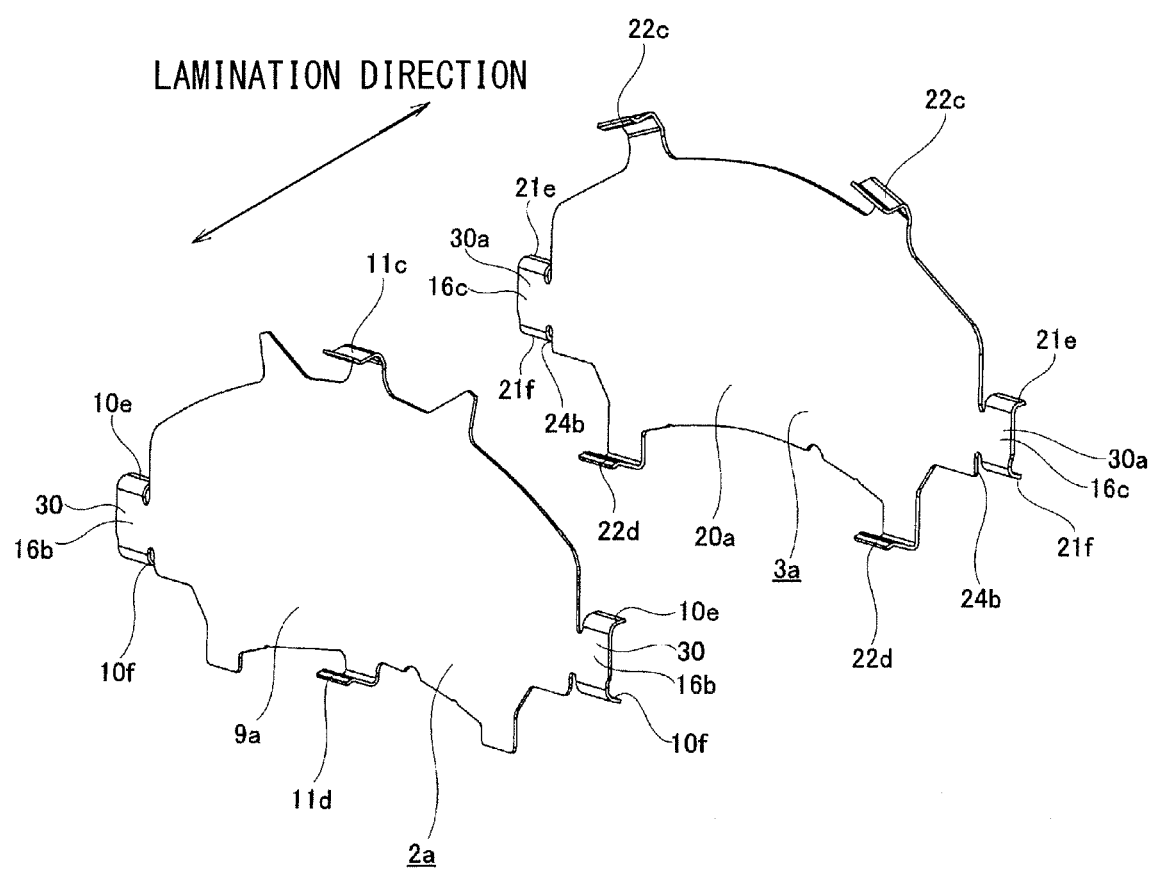
FIG. 19 is an exploded perspective view of the laminated shim according to the third embodiment.
Figure 20A:
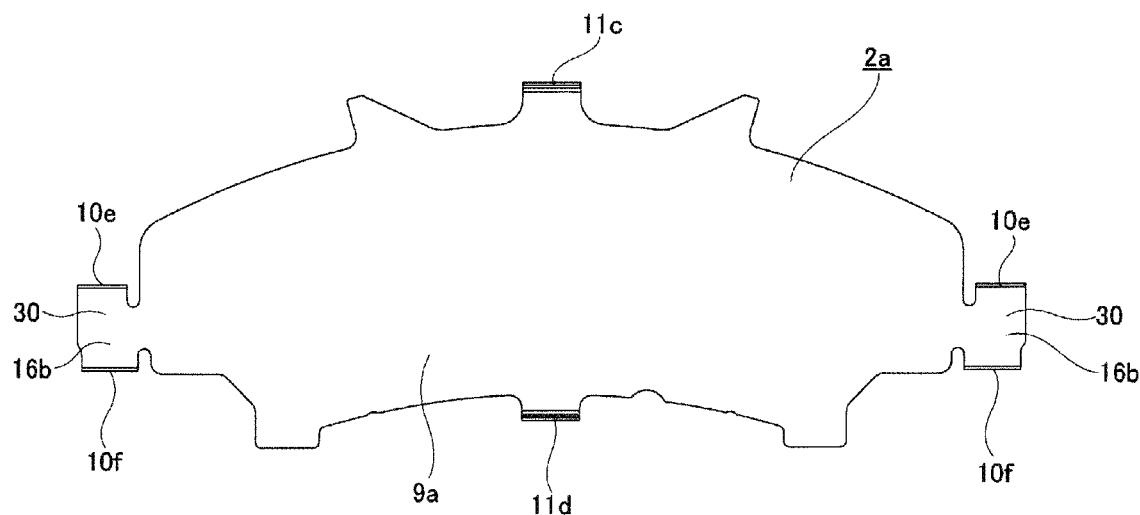
FIG. 20A is an orthographic projection view of a base shim plate taken from the laminated shim according to the third embodiment as seen from the front surface side.
Figure 20B:
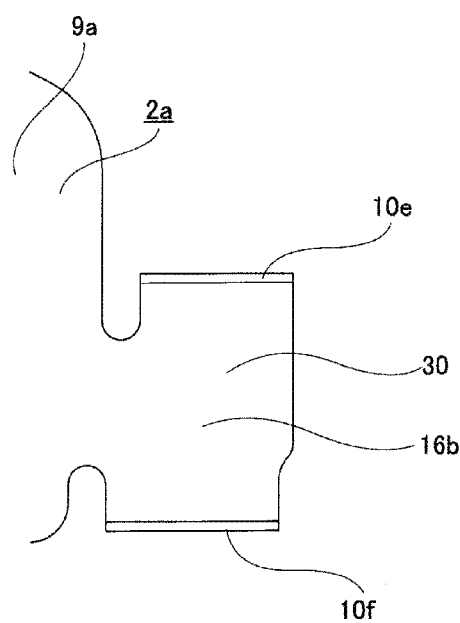
FIG. 20B is an enlarged view of a part of FIG. 20A.
Figure 21A:
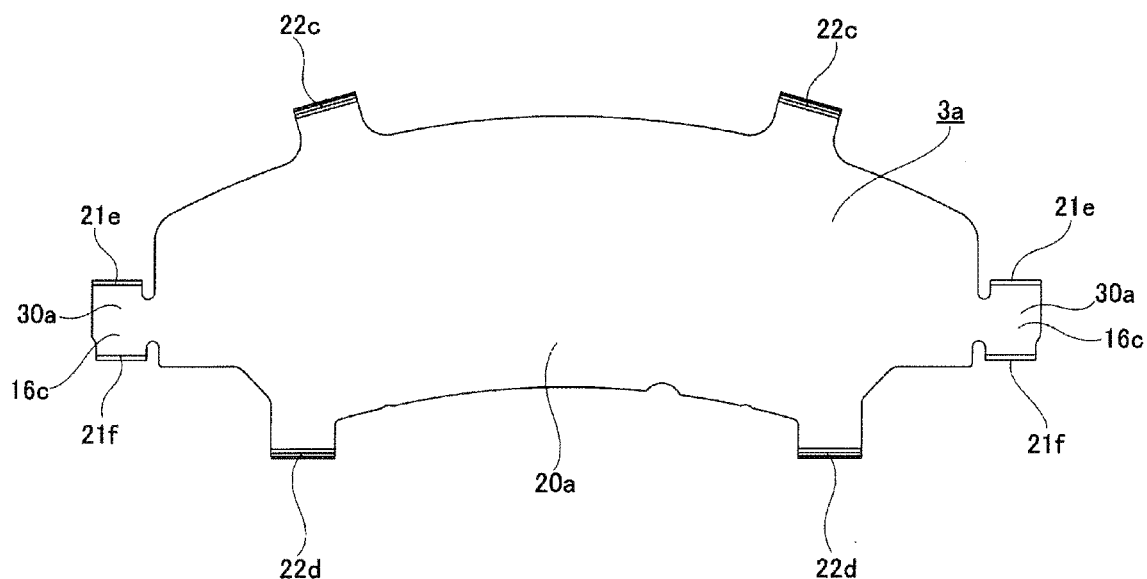
FIG. 21A is an orthographic projection view of a cover shim plate taken from the laminated shim according to the third embodiment as seen from the front surface side.
Figure 21B:
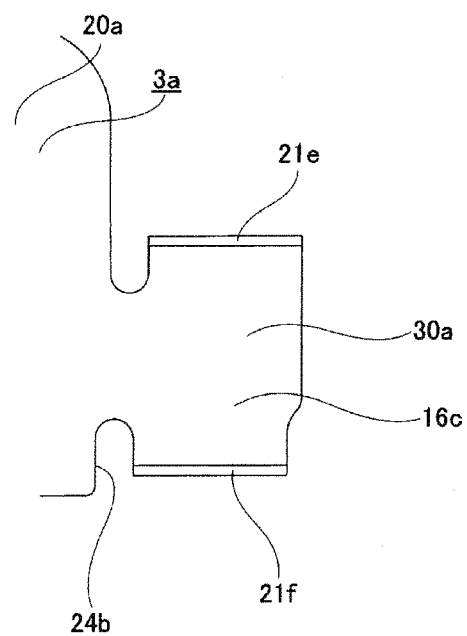
FIG. 21B is an enlarged view of a part of FIG. 21A.

Further, in the third embodiment, a width dimension T10f of the radially inner base side locking piece 10f in the circumferential direction is larger than a width dimension T21f of the radially inner cover side locking piece 21f in the circumferential direction (T10f>T21f). Therefore, as shown in FIG. 16, circumferential inner end portions of the base side locking pieces 10f project over circumferential inner end portions of the cover side locking pieces 21f at an inner side in the circumferential direction separately. The circumferential inner end portions of the base side locking pieces 10f are opposed to movement restricting surfaces 24b facing the circumferential direction, which are both circumferential side edges of the cover side substrate portion 20a, with a minute gap 25b interposed therebetween.

On the other hand, a width dimension T10e of the radially outer base side locking piece 10e in the circumferential direction is the same as a width dimension T21e of the radially outer cover side locking piece 21e in the circumferential direction (T10e=T21e). Therefore, as shown in FIG. 16, a circumferential inner end portion of the base side locking piece 10e is in the same position as a circumferential inner end portion of the cover side locking piece 21e in the circumferential direction. For this reason, there is a gap 25c larger than the gap 25b between the circumferential inner end portion of the base side locking piece 10e and both circumferential side edges of the cover side substrate portion 20a.

Base side attachment pieces 11c, 11d which are extending toward a base shim plate 2a side in the lamination direction are separately provided on the base shim plate 2a at circumferential central portions of a radially outer circumferential edge and a radially inner circumferential edge of the base side substrate portion 9a respectively. In addition, cover side attachment pieces 22c, 22d which are extending toward the base shim plate 2a side in the lamination direction separately are provided on the cover shim plate 3a at both circumferential side portions of a radially outer circumferential edge and a radially inner circumferential edge of the cover side substrate portion 20a respectively.

Figure 22:
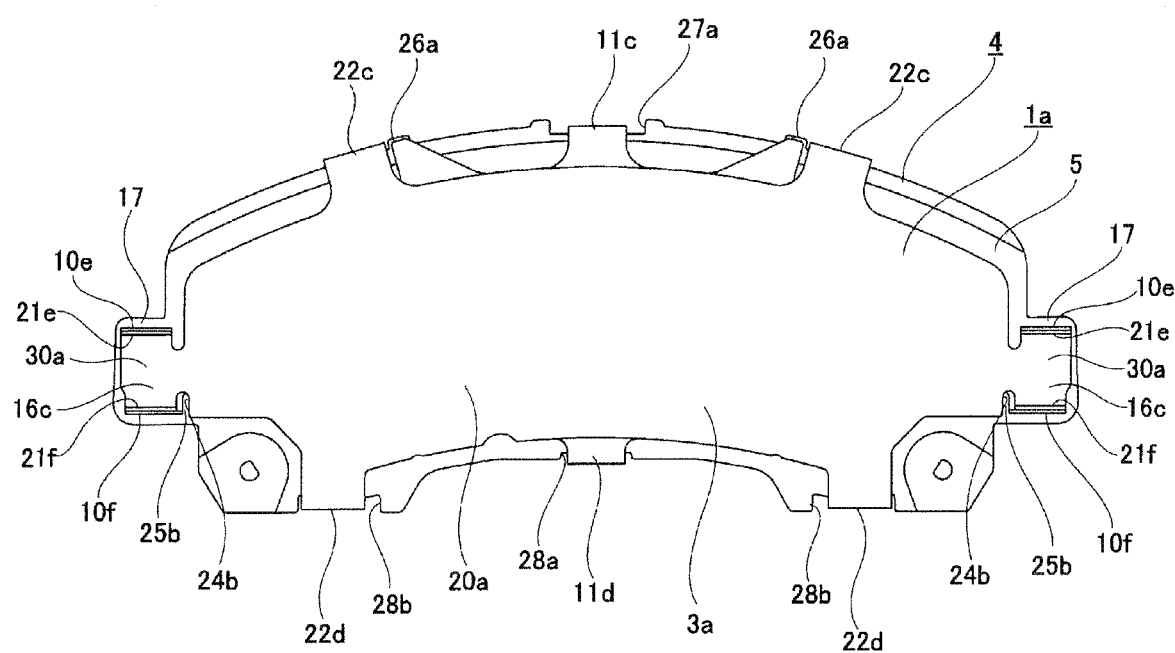
FIG. 22 is an orthographic projection view of a pad mounted with the laminated shim according to the third embodiment as seen from the back surface side.
Figure 23:
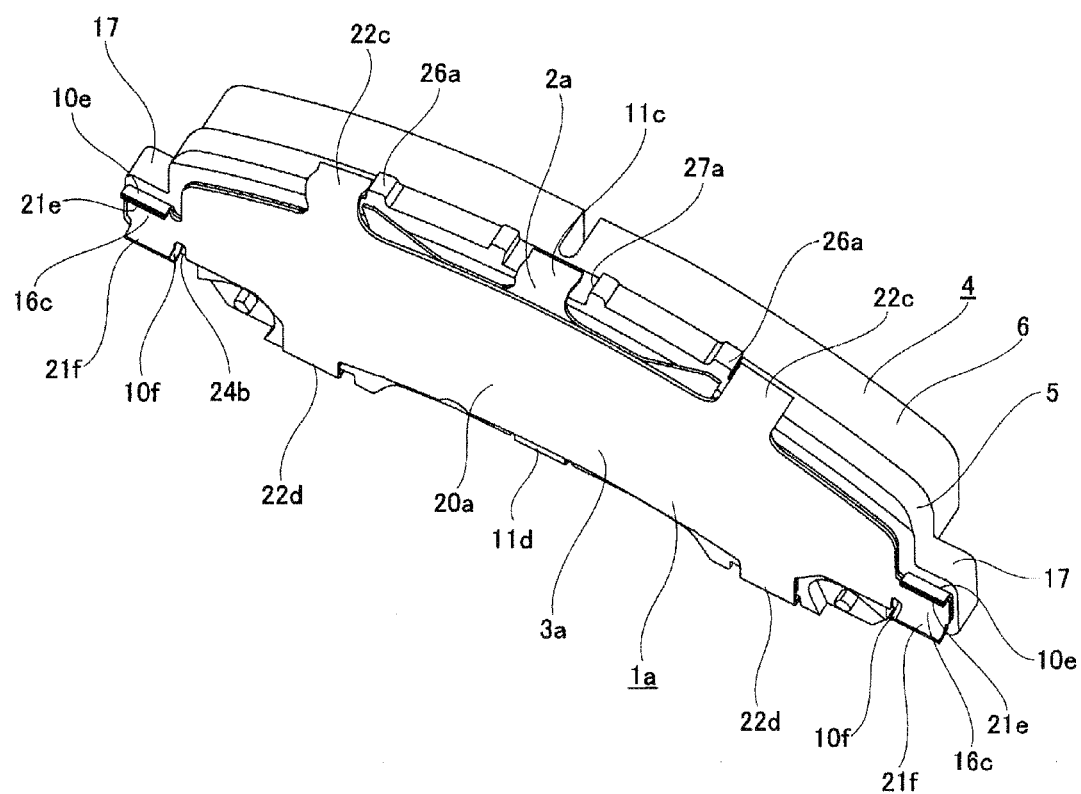
FIG. 23 is a perspective view of the pad mounted with the laminated shim according to the third embodiment.

As shown in FIGS. 22 and 23, when the laminated shim 1a of the third embodiment is mounted on a pad 4a, the radially outer base side attachment pieces 11c are engaged with outer side engaging recesses 27a formed at a circumferential central portion of a radially outer circumferential edge of a pressure plate 5a, and circumferential inner side edges of the pair of radially outer cover side attachment pieces 22c are engaged with circumferential outer side surfaces of a pair of projection portions 26a formed on both circumferential side portions of the radially outer circumferential edge of the pressure plate 5a. Further, the radially inner base side attachment pieces 11d are engaged with inner side engaging recesses 28a formed at a circumferential central portion of a radially inner circumferential edge of the pressure plate 5a, and the pair of radially inner cover side attachment pieces 22d are engaged with inner side engaging recesses 28b formed at both circumferential side portions of the radially inner circumferential edge of the pressure plate 5a.

In the third embodiment having such a configuration, the width dimension T10f of the radially inner base side locking piece 10f in the circumferential direction is larger than the width dimension T21f of the radially inner cover side locking piece 21f in the circumferential direction (T10f>T21f), and the circumferential inner end portions of the base side locking pieces 10f project over circumferential inner end portions of the cover side locking pieces 21f at an inner side in the circumferential direction separately. Therefore, the circumferential inner end portions of the base side locking pieces 10f are opposed to the movement restricting surfaces 24b facing the circumferential direction, which are both circumferential side edges of the cover side substrate portion 20a, with the minute gap 25b interposed therebetween. For this reason, when the base shim plate 2a moves in the circumferential direction together with the pad 4 during braking by a disc brake device, circumferential end portions of the cover side locking pieces 21f abut against the movement restricting surfaces 24a in the circumferential direction. Therefore, the movement of the base shim plate 2a with respect to the cover shim plate 3a in the circumferential direction is restricted. Other configurations and operational effects of the third embodiment are the same as those in the first embodiment.

Fourth Embodiment

Figure 24:
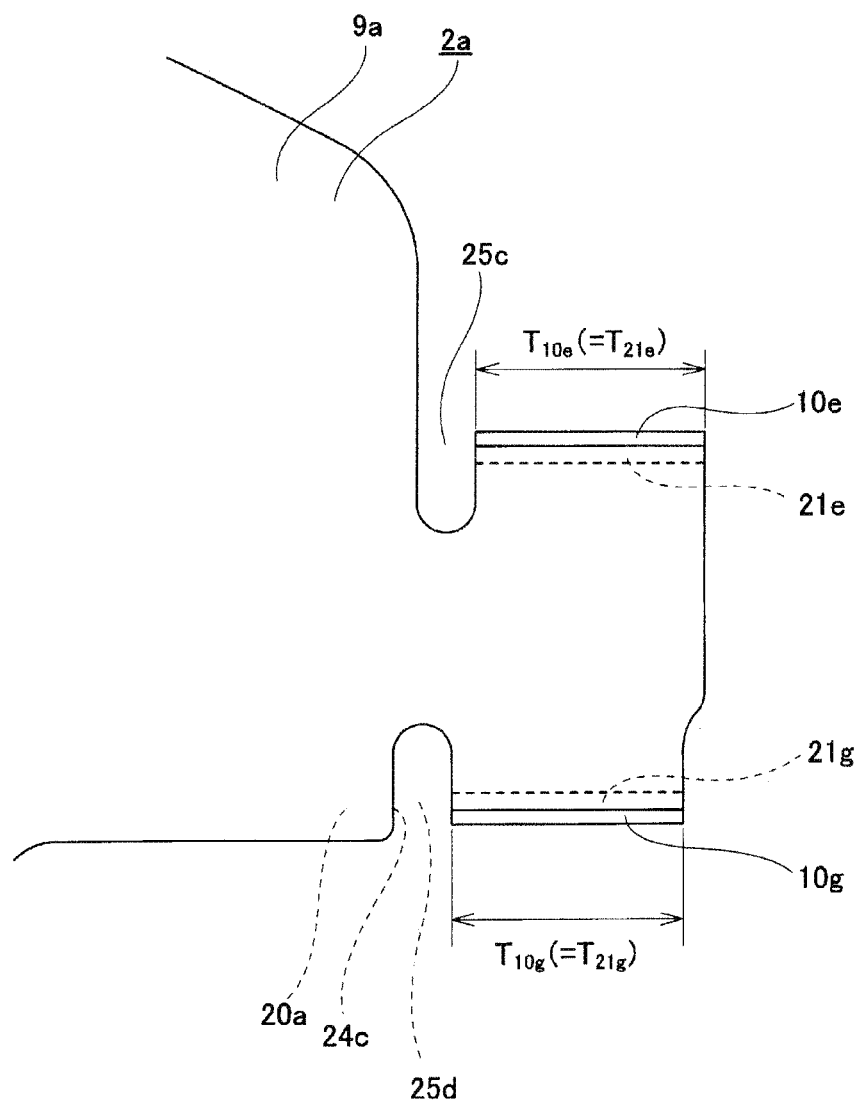
FIG. 24 is a view equivalent to FIG. 16 relating to a laminated shim according to a fourth embodiment.

A fourth embodiment will be described with reference to FIG. 24. The fourth embodiment is a modification of the third embodiment. In the fourth embodiment, not only is the width dimension T10e of the radially outer base side locking piece 10e in the circumferential direction the same as the width dimension T21e of the radially outer cover side locking piece 21e in the circumferential direction (T10e=T21e), a width dimension T10g of a radially inner base side locking piece 10g in the circumferential direction is also the same as a width dimension T21g of a radially inner cover side locking piece 21g in the circumferential direction (T10g=T21g). Therefore, compared to the structure of the third embodiment, a circumferential dimension of a gap 25d between a circumferential inner end portion of the base side locking piece 10g and a movement restricting surface 24c of the cover side substrate portion 20a is larger. Further, in the fourth embodiment, the size of the gap 25d between the circumferential inner end portion of the radially inner base side locking piece 10g and the movement restricting surface 24c of the cover side substrate portion 20a is the same as the size of the gap 25c between the circumferential inner end portion of the radially outer base side locking piece 10e and the movement restricting surface 24c.

In the fourth embodiment having such a configuration, when the base shim plate 2a moves in the circumferential direction with respect to the cover shim plate 3a, a displacement amount of the base shim plate 2a with respect to the cover shim plate 3a in the circumferential direction is larger than that in the third embodiment. However, in the fourth embodiment, the movement of the base shim plate 2a in the circumferential direction with respect to the cover shim plate 3a can also be restricted by circumferential inner end portions of the base side locking pieces 10e, 10g and the movement restricting surfaces 24c abutting against each other. Other configurations and operational effects of the fourth embodiment are the same as those in the first, second and third embodiments.

Although a structure in which base side locking pieces and cover side locking pieces separately provided on both circumferential sides of the laminated shim are inserted into a pair of recesses provided at both circumferential side portions of a pressure plate is explained as an example in the first and second embodiments, the laminated shim of the present invention can also adopt a structure in which a base side locking piece and a cover side locking piece are provided at a position in the circumferential direction such as a circumferential central portion for example, and the base side locking piece and cover side locking piece are inserted into recesses provided at a position of the pressure plate in the circumferential direction. The number and positions of the formed base side locking piece and cover side locking piece are not limited to the structures of each embodiment, and can be appropriately changed according to the shape of a pad on which the laminated shim is to be mounted, and the shape and structure of a pad supporting member to which the pad is assembled. For the same reason, the number and positions of the formed attachment pieces provided on the base side shim plate and the cover side shim plate are also not limited to the structures of each embodiment. Further, a coating such as a rubber coating can be applied to surfaces of the base shim plate and the cover shim plate if necessary. Furthermore, the structures of the embodiments may be combined as appropriate.

According to the laminated shim for a disc brake of the present invention, a displacement amount in the circumferential direction between a base shim plate and a cover shim plate can be prevented from becoming excessive.

What is claimed is:

1. A laminated shim for a disc brake comprising:
   a base shim plate configured to be attached to a back surface of a pressure plate of a pad for the disc brake; and
   a cover shim plate laminated at a back surface side of the base shim plate,
   wherein the base shim plate includes:
   a base side substrate portion having a flat shape, and
   a base side locking piece extending from the base side substrate portion in a lamination direction of the base shim plate and the cover shim plate,
   wherein the cover shim plate includes:
   a cover side substrate portion which has a flat plate shape and is laminated on the base side substrate portion, and
   a cover side locking piece which extends from the cover side substrate portion in an extension direction of the base side locking piece and is overlapped with respect to the base side locking piece in a radial direction of a rotor of the disc brake,
   wherein a circumferential end portion of one of the base side locking piece and the cover side locking piece of corresponding one of the base shim plate and the cover shim plate that is arranged at a rear side in the extension direction abuts against a movement restricting surface facing a circumferential direction and provided at one of the base side substrate portion and the cover side substrate portion of the other one of the base shim plate and the cover shim plate, so that movement of the one of the base shim plate and the cover shim plate in the circumferential direction with respect to the other one is restricted,
   the base side substrate portion is formed with a base side through hole, and the base side locking piece extends from a radial edge of the base side through hole in the lamination direction, and
   the cover side substrate portion is formed with a cover side through hole, and the cover side locking piece extends from a radial edge of the cover side through hole in the extension direction.

2. The laminated shim according to claim 1, wherein a circumferential dimension of the base side locking piece is different from a circumferential dimension of the cover side locking piece.

3. The laminated shim according to claim 1, wherein a tip end portion of the base side locking piece and a tip end portion of the cover side locking piece are inserted into a recess provided on the back surface of the pressure plate.

4. The laminated shim for a disc brake according to claim 1, wherein
   the base shim plate and the cover shim plate are bonded to each other by an adhesive.

* * * * *